(12) United States Patent  (10) Patent No.: US 11,593,190 B1
Liu et al.  (45) Date of Patent: *Feb. 28, 2023

(54) DETECTING SHINGLED OVERWRITE ERRORS

(71) Applicant: Seagate Technology LLC, Cupertino, CA (US)

(72) Inventors: Xiong Liu, Singapore (SG); WeiQing Zhou, Singapore (SG); Quan Li, Singapore (SG); WenXiang Xie, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 15/383,127

(22) Filed: Dec. 19, 2016

Related U.S. Application Data

(63) Continuation of application No. 15/044,302, filed on Feb. 16, 2016, now Pat. No. 9,536,563.

(51) Int. Cl.
| | |
|---|---|
| *G06F 11/07* | (2006.01) |
| *G11B 20/12* | (2006.01) |
| *G11B 20/18* | (2006.01) |
| *G06F 12/0871* | (2016.01) |
| *G06F 11/14* | (2006.01) |

(52) U.S. Cl.
CPC ........ *G06F 11/0727* (2013.01); *G06F 11/076* (2013.01); *G06F 11/079* (2013.01); *G06F 11/0793* (2013.01); *G06F 11/1469* (2013.01); *G06F 12/0871* (2013.01); *G11B 20/1217* (2013.01); *G11B 20/1879* (2013.01); *G06F 2201/81* (2013.01); *G06F 2212/1032* (2013.01); *G06F 2212/281* (2013.01); *G06F 2212/462* (2013.01); *G11B 2020/1238* (2013.01); *G11B 2020/1292* (2013.01)

(58) Field of Classification Search
CPC . H04L 1/20; H04L 1/24; H04L 1/0061; G06F 11/076; G06F 11/0727; G06F 11/0793; G06F 11/079; G06F 12/0871; G06F 11/1469; G06F 2201/81; G06F 2212/462; G06F 2212/281; G06F 2212/1032; G06F 12/0971; G01R 31/3171; G11B 20/1879; G11B 20/1217; G11B 2020/1292; G11B 2020/1238
USPC ....................................................... 714/704
See application file for complete search history.

(56) References Cited

U.S. PATENT DOCUMENTS

| | | |
|---|---|---|
| 5,153,866 A | 10/1992 | Satoh et al. |
| 5,701,304 A | 12/1997 | Glover et al. |

(Continued)

*Primary Examiner* — Shelly A Chase
*Assistant Examiner* — Enam Ahmed
(74) *Attorney, Agent, or Firm* — Christian W. Best

(57) ABSTRACT

Systems and methods are disclosed for detecting shingled overwrite errors. When a read error is encountered when reading from shingled recording tracks, a processor may determine whether the read error is an error caused by shingled overwriting. The processor may determine whether the read error is caused by shingled overwriting by determining read signal quality of one or more sectors preceding the read error, such as based on a bit error count or bit error ratio (BER), and comparing the read signal quality to a threshold value. The processor may determine that the read error is caused by shingled overwriting when the read signal quality value is lower than the threshold.

19 Claims, 9 Drawing Sheets

(56) References Cited

U.S. PATENT DOCUMENTS

| | | | |
|---|---|---|---|
| 5,751,733 A | 5/1998 | Glover | |
| 5,758,057 A * | 5/1998 | Baba | G06F 11/0727 |
| | | | 711/114 |
| 5,872,800 A * | 2/1999 | Glover | G11B 20/1833 |
| | | | 714/766 |
| 6,043,945 A * | 3/2000 | Tsuboi | G11B 20/1816 |
| | | | 360/47 |
| 6,332,204 B1 * | 12/2001 | Russell | G11B 20/1883 |
| | | | 714/704 |
| 6,345,074 B1 * | 2/2002 | Turk | G11B 20/1866 |
| | | | 375/341 |
| 6,384,999 B1 * | 5/2002 | Schibilla | G11B 20/1883 |
| | | | 714/704 |
| 6,903,387 B2 * | 6/2005 | Hase | H01L 29/201 |
| | | | 257/197 |
| 6,903,887 B2 * | 6/2005 | Asano | G11B 20/1866 |
| | | | 714/704 |
| 7,136,244 B1 * | 11/2006 | Rothberg | G11B 20/10037 |
| | | | 360/53 |
| 7,197,593 B2 | 3/2007 | Fukuhisa et al. | |
| 7,584,389 B2 * | 9/2009 | Park | H03M 13/3927 |
| | | | 714/704 |
| 7,653,847 B1 * | 1/2010 | Liikanen | G01R 33/1207 |
| | | | 714/723 |
| 8,369,307 B2 * | 2/2013 | Miyoshi | H04L 1/1854 |
| | | | 714/707 |
| 8,611,032 B2 | 12/2013 | Champion et al. | |
| 8,625,215 B1 * | 1/2014 | Burd | 360/31 |
| 8,699,175 B1 | 4/2014 | Olds | |
| 8,947,805 B1 * | 2/2015 | Coker | G11B 20/10296 |
| | | | 360/39 |
| 8,976,478 B1 | 3/2015 | Harllee | |
| 8,988,800 B1 | 3/2015 | Varnica | |
| 9,001,442 B2 * | 4/2015 | Park | G11B 27/36 |
| | | | 360/31 |
| 10,108,481 B1 * | 10/2018 | Kataria | G06F 11/0793 |
| 10,607,645 B1 * | 3/2020 | Hamaguchi | G11B 5/5552 |
| 2003/0147168 A1 * | 8/2003 | Galbraith | G11B 20/10055 |
| | | | 360/53 |
| 2007/0250757 A1 * | 10/2007 | Takahashi | G11B 20/1879 |
| | | | 714/763 |
| 2007/0273999 A1 * | 11/2007 | Utsumi | G11B 5/59627 |
| | | | 360/75 |
| 2008/0005645 A1 | 1/2008 | Takemura et al. | |
| 2008/0239560 A1 * | 10/2008 | Yakuwa | G11B 5/3136 |
| | | | 360/77.14 |
| 2009/0241011 A1 * | 9/2009 | Yamamoto | G11C 29/82 |
| | | | 714/769 |
| 2011/0292533 A1 | 12/2011 | Nitta | |
| 2012/0224277 A1 * | 9/2012 | Steiner | G11B 5/746 |
| 2012/0307400 A1 | 12/2012 | Kawabe | |
| 2013/0021689 A1 * | 1/2013 | Haratsch | G11B 20/1423 |
| | | | 360/45 |
| 2013/0031406 A1 | 1/2013 | Cho | |
| 2013/0148225 A1 | 6/2013 | Coker et al. | |
| 2013/0194689 A1 | 8/2013 | Takai | |
| 2014/0036381 A1 * | 2/2014 | Brockie | G11B 5/012 |
| | | | 360/49 |
| 2014/0101515 A1 * | 4/2014 | Akiyama | G11B 5/09 |
| | | | 714/763 |
| 2015/0254135 A1 | 9/2015 | Chatradhi | |
| 2017/0200470 A1 * | 7/2017 | Kojima | G11B 20/1833 |
| 2019/0378543 A1 * | 12/2019 | Maeto | G11B 5/012 |
| 2020/0394105 A1 * | 12/2020 | Tao | G06F 3/0631 |

\* cited by examiner

600

| | Sector ID (604) | No. Bad Bits (606) | VGA (608) |
|---|---|---|---|
| Entry 1 | 00108 | 8 | 253 |
| Entry 2 | 00109 | 10 | 272 |
| Entry 3 | 00110 | 5 | 250 | ← Buffer Pointer 602
| ... | ... | ... | ... |
| Entry N | 00107 | 8 | 252 |

FIG. 6

DETECTING SHINGLED OVERWRITE ERRORS

SUMMARY

In certain embodiments, an apparatus may comprise a processor configured to detect a read error at a first sector when performing a read operation on shingled recording tracks. The processor may determine whether the read error is an error caused by shingled overwriting, and cancel error recovery operations for the first sector when the error is determined to be caused by shingled overwriting.

In certain embodiments, a method may comprise detecting a read error at a first sector when performing a read operation on shingled recording tracks of a data storage device, determining whether the read error is an error caused by shingled overwriting of the first sector, and canceling error recovery operations for the first sector when the error is determined to be caused by shingled overwriting.

In certain embodiments, a memory device may store instructions that, when executed, cause a processor to perform a method comprising detecting a read error at a first sector when performing a read operation on shingled recording tracks of a data storage device. The method may also comprise determining whether the read error is an error caused by shingled overwriting of the first sector, and canceling error recovery operations for the first sector when the error is determined to be caused by shingled overwriting.

BRIEF DESCRIPTION OF THE DRAWINGS

FIG. 6 depicts a table representing a buffer of a system for detecting shingled overwrite errors, in accordance with certain embodiments of the present disclosure;

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that, when executed, cause a processor to perform the methods.

Figure 1:
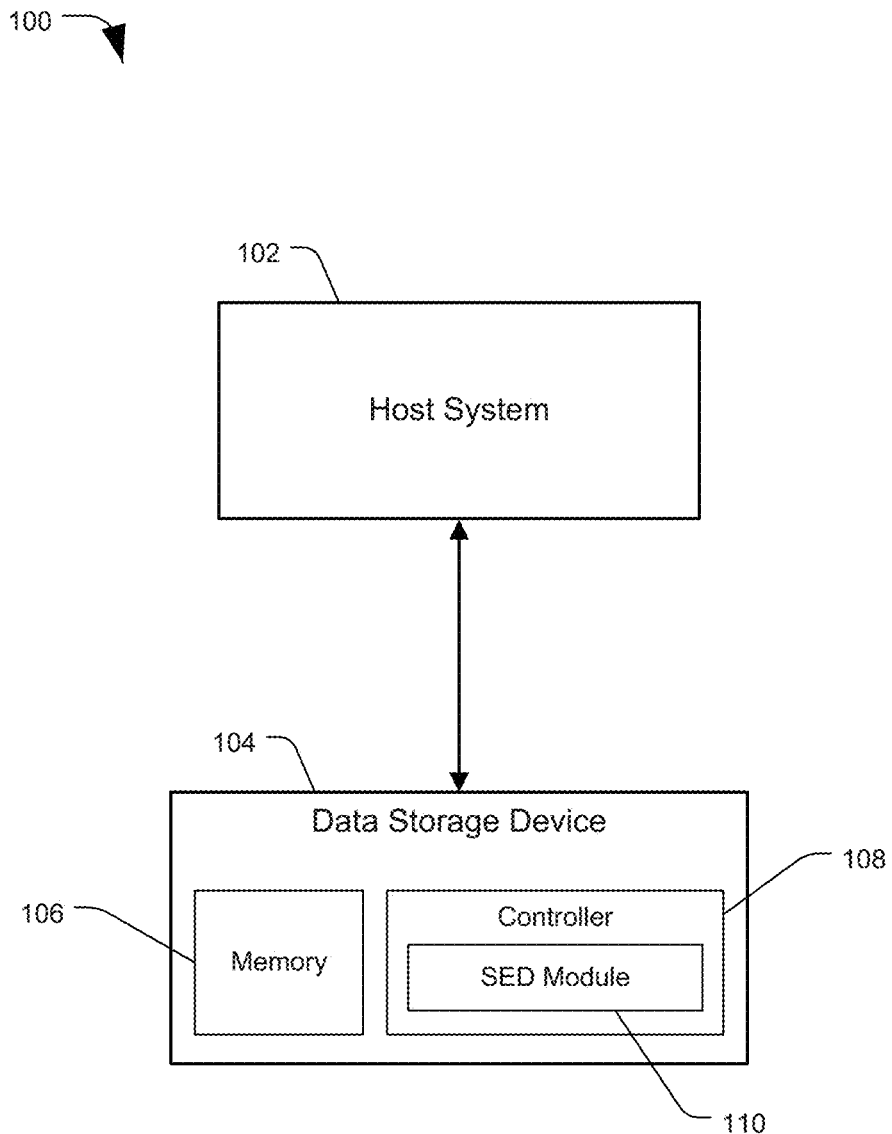
FIG. 1 is a diagram of a system for detecting shingled overwriting errors, in accordance with certain embodiments of the present disclosure.

FIG. 1 is a diagram of a system for detecting shingled overwriting errors, generally designated 100, in accordance with certain embodiments of the present disclosure. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The DSD 104 may receive a data read or write request from the host device 102, and use the controller 108 to perform data operations on the memory 106 based on the request. The controller 108 may comprise a circuit or processor configured to control operations of the data storage device 104, such as the methods and functions described herein, as well as storing data to or retrieving data from the memory 106. The memory 106 may comprise magnetic storage media such as disc drives, nonvolatile solid state memories such as Flash memory, other types of memory, or a combination thereof.

DSD 104 may include a shingled error detection (SED) module 110. A "module" may include one or more physical components of a computing device (e.g., circuits, processors, etc.), may include instructions that, when executed, can cause a processor to perform a particular task or job, or any combination thereof. A module may be configured to perform a particular task or job. The SED module 110 may determine whether an error encountered while reading data from a memory 106 is due to shingled overwriting of the target read location. For example, the DSD 104 may receive a read command from the host 102 including a target read location. While performing a read at the target read location, the DSD 104 may encounter an error and be unable to successfully read the data on a first attempt. How the DSD 104 handles the read error (sometimes called an unrecoverable data error or UDE) may depend on whether the error is due to the target location being overwritten by shingled data, or whether the error is due to other causes (e.g. misalignment of read head, misalignment of write head when the data was written, magnetic signal degradation, etc.). DSD 104 may be configured to perform a number of error recovery operations when a read error is encountered. The error recovery operations may include attempting to recover data from the physical location associated with the error rather than recovering the data from another data source; e.g. simple read retries, adjusting a read head offset position, adjusting read channel and decoding parameters, etc. A read error due to shingled overwriting may not be recoverable by such error correction techniques, however. If the DSD 104 attempts to employ such error correction techniques when a shingled UDE is encountered, it may cause a command timeout (CTO) for the host command due to spending time on ineffective error recovery operations. CTOs reduce the throughput and performance of a DSD 104.

The SED module 110 may determine whether the error was caused by shingled overwriting resulting in a shingled UDE, thereby allowing the DSD 104 to make an informed decision regarding how to handle the error. The SED module 110 may be a processor, controller, or other circuit, or it may be a set of software instructions that, when executed by a processing device, perform the functions of the SED module 110. In some embodiments, the SED module 110 may be part of or executed by controller 108. A more detailed example embodiment of a DSD 104 is described in regards to FIG. 2.

Figure 2:
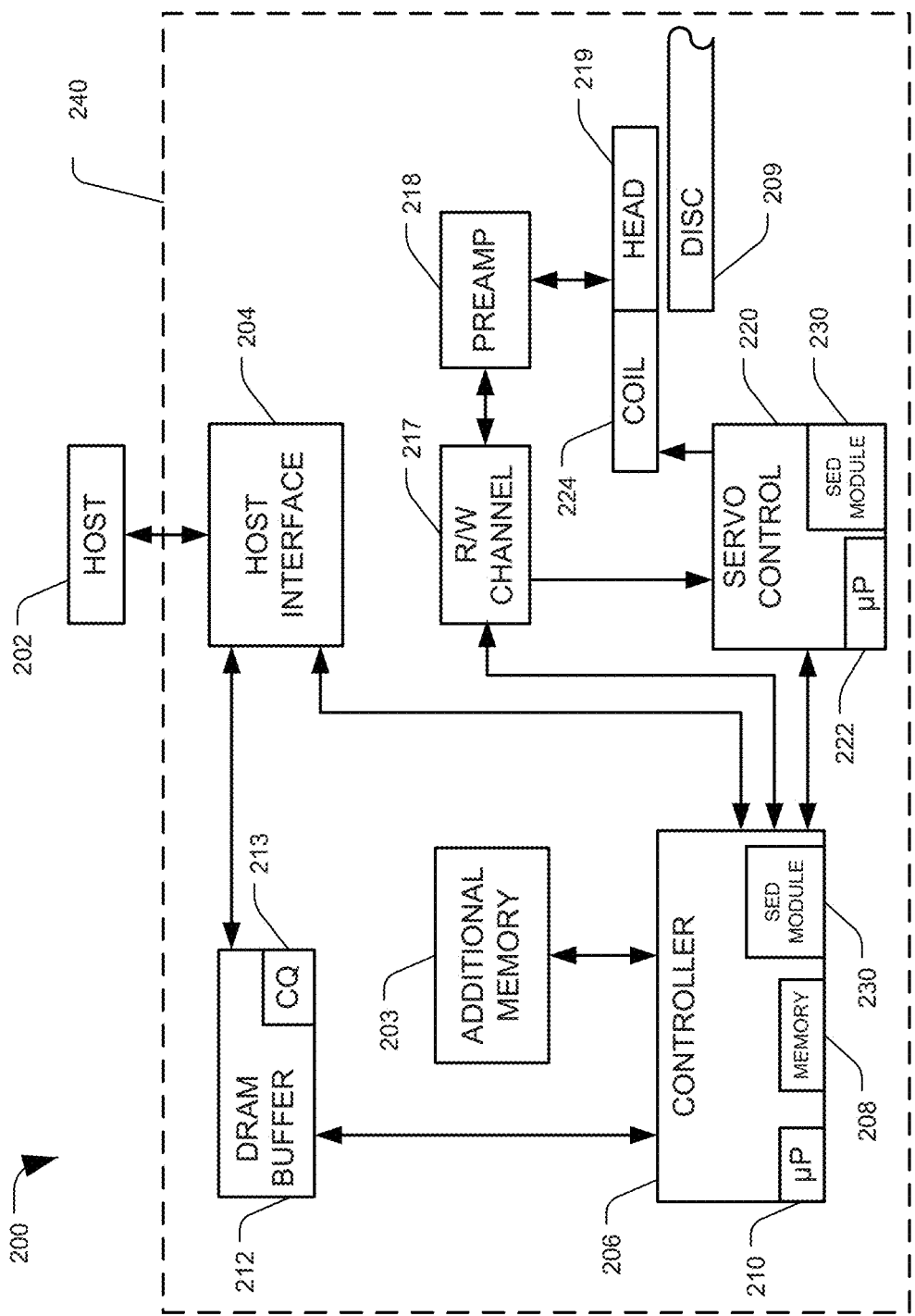
FIG. 2 is a diagram of a system for detecting shingled overwriting errors, in accordance with certain embodiments of the present disclosure.

FIG. 2 is a diagram of a system 200 for detecting shingled overwriting errors, in accordance with certain embodiments of the present disclosure. Specifically, FIG. 2 provides a functional block diagram of an example data storage device (DSD) 200. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD 200, or the components of the DSD 200 may be attached to the housing, or a combination thereof. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of readback signals. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213.

In some embodiments, the DSD 200 may include an additional memory 203 instead of or in addition to disc memory 209. For example, additional memory 203 can be a solid state memory, which can be either volatile memory such as DRAM or SRAM, or non-volatile memory, such as NAND Flash memory. The additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

DSD 200 may include a shingled error detection (SED) module 230. The SED module 230 may perform operations to determine whether a read error is due to shingled overwriting of the target read location or sector(s) on the disc 209. The SED module 230 may be a processor, controller, or other circuit, or it may be a set of software instructions that, when executed by a processing device, perform the functions of the SED module 230. In some embodiments, the SED may be part of or executed by controller 206, part of or executed by servo control circuit 220, included in or performed by other components of the DSD 200, a stand-alone component, or any combination thereof.

Shingled recording, sometimes referred to as shingled magnetic recording (SMR) in the case of magnetic storage media such as hard discs, is a recording method used to increase the amount of data stored to a storage medium.

As discussed above, the head(s) 219 of DSD 200 may be used to write data to and read data from disc(s) 209. The head(s) 219 may include both a write head element and a read head element. The write head produces a magnetic field to store data to the disc(s) 209. As the disc(s) 209 spin, the write head can store data in narrow concentric or spiral data tracks on the disc. The read head can read data from the disc(s) by detecting magnetic signals stored to the disc(s) 209. The write head may larger or wider than the read head, or may generally record data to the disc(s) 209 in a larger area than is required by the read head to successfully read the data. Accordingly, a DSD 200 may be configured to partially overlap the placement of the written data tracks in a shingled manner. While a portion of a track may be overwritten by adjacent tracks, enough of the track remains that the read head can still read the data from the remaining unshingled portion of the track. However, if too much of a track is overwritten by adjacent tracks, it may produce a shingled overwrite error, and the overwritten data may be unrecoverable. If a DSD 200 is not aware that an encountered read error is a shingled overwrite error, the DSD 200 may waste a large amount of time attempting error recovery procedures on data that cannot be recovered, which may result in commands timing out. The SED module 230 may be used to identify shingled overwriting errors and allow the DSD 200 to avoid time and resources attempting error recovery operations.

Figure 3A:
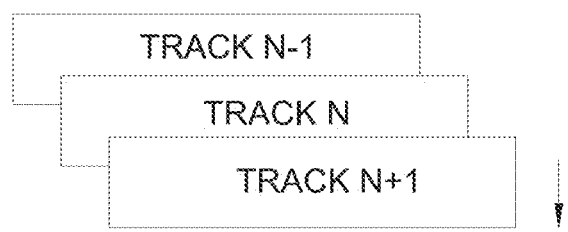
FIGS. 3A and 3B are diagrams of a system for detecting shingled overwriting errors, in accordance with certain embodiments of the present disclosure.
Figure 3B:
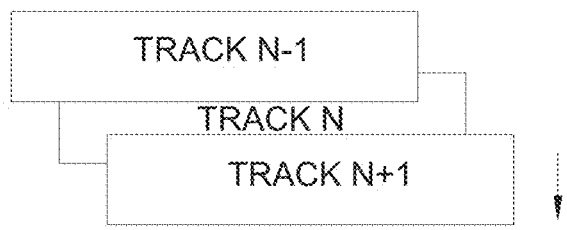

FIG. 3A and 3B are diagrams of examples of a system for detecting shingled overwriting errors, in accordance with certain embodiments of the present disclosure. FIGS. 3A and 3B depict data recording tracks arranged in a shingled manner according to certain embodiments of the present disclosure. With shingled recording tracks, each track may partially overlap an adjacent track, and data may only be written in a specified direction (e.g. first track N−1, then track N, then track N+1, etc.). The shingle write direction may be referred to as the "positive" direction, while the opposite writing direction may be referred to as the "negative" direction. It should be understood that the positive direction may be from the inner diameter (ID) to the outer diameter (OD) of the recording medium, or vice versa. The positive direction may even be different per zone or per shingled recording band, for example based on a write head's writing capabilities in different directions at different points over a recording medium.

Referring to FIG. 3A, if it is assumed that writing is performed in the arrow-indicated positive direction in the shingle-write scheme, when writing to track N, adjacent track N−1 may be partially overwritten. Similarly, when writing is performed on track N+1, adjacent track N may be partially overwritten. In contrast to recording methods where each track is written without any intentional overlap, shingled magnetic recording (SMR) may result in increased recording density due to a higher tracks per inch (TPI) characteristic in a radial direction of a storage medium.

As illustrated in FIG. 3B, after writing on track N and N+1, if track N−1 is written in the negative shingled recording direction, track N may become unreadable due to Adjacent Track Interference (ATI), or being partially overwritten by both adjacent tracks (i.e. track N−1 and track N+1). Therefore, it may be advantageous to follow a constraint that track N−1 should not be written after track N is written. Accordingly, writing or modifying data on track N−1 after track N is recorded, or on track N after track N+1 is recorded, may require a different writing strategy than with non-shingled tracks, which can simply be overwritten at any time. Modifying a target track may include re-writing all shingled tracks following the target track in a sequential order in the positive direction.

Figure 4:
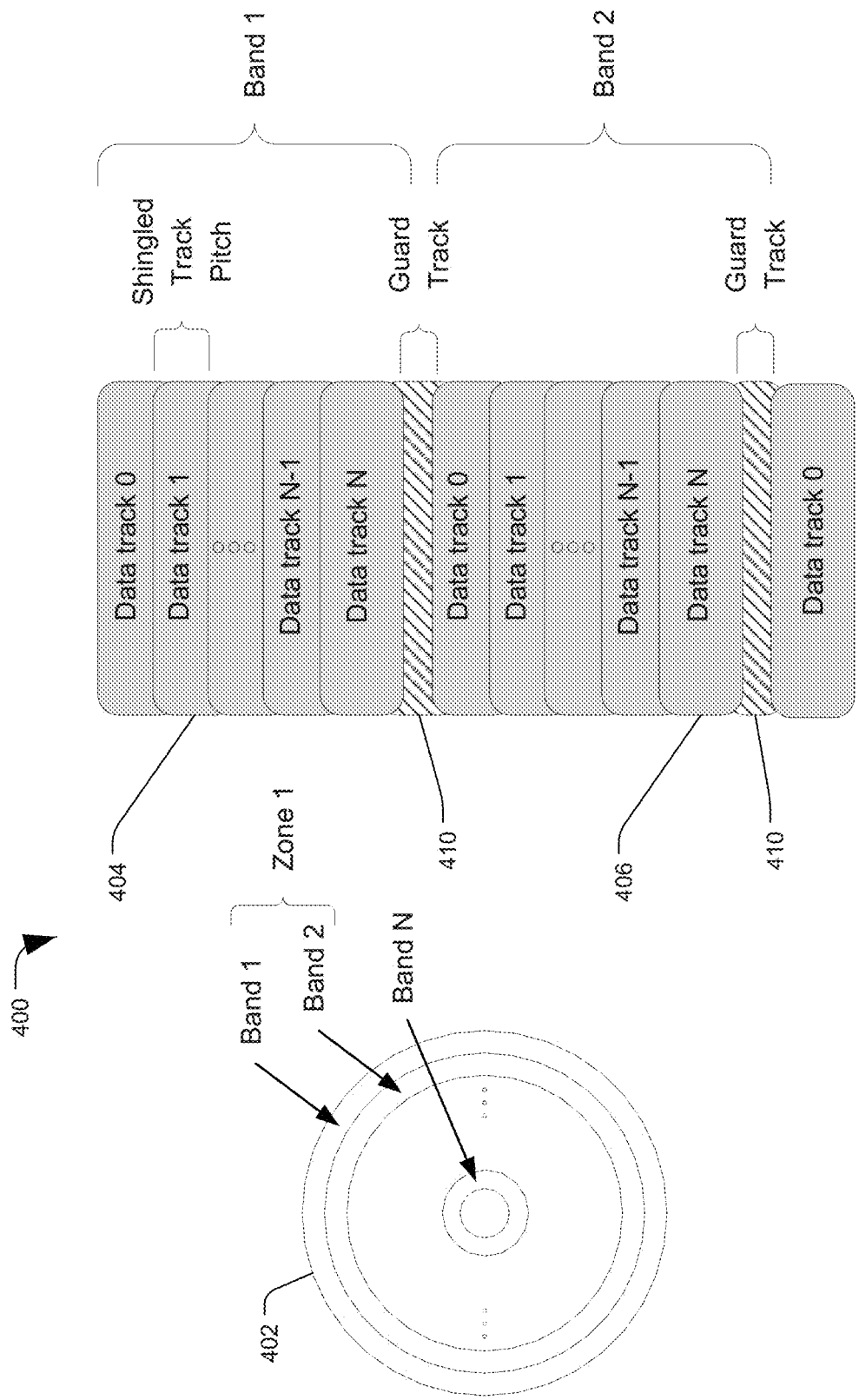
FIG. 4 is a diagram of a system for detecting shingled overwriting errors, in accordance with certain embodiments of the present disclosure.

FIG. 4 is a diagram of a system 400 for detecting shingled overwrite errors, in accordance with certain embodiments of the present disclosure. Due to the track write overlap of SMR, writing a given track N−1 after track N has been written may require rewriting all shingled tracks that following track N−1 (i.e. track N, track N+1, track N+2, etc.). In order to accomplish this realistically, a set of shingled tracks may be grouped into a "band," such that writing the last track of a given band X does not require rewriting any of the following tracks in bands X+1, X+2, X+3 and so on. Rotating disc media 402 may be divided into a plurality of bands (e.g. Band 1, Band 2, etc.), and each band may contain a plurality of shingled data tracks, in which at least one data track partially overlaps another data track in a shingled manner. The disc 402 may also be divided into a group of zones, with each zone including a set of contiguous bands (e.g. zone 1 may include bands 1 and 2, while zone M may include bands N−1 and band N).

Separating bands so that rewriting one does not require rewriting tracks outside the band can be accomplished by locating the tracks such that the last track of a band is not trimmed or overlapped by a track that can be written. Each band may have a number of shingled tracks 404, such as tracks 0 through N−1 of FIG. 4, which are partially overlapped by adjacent tracks. The track pitch of a shingled track 404 may refer to the width of the unshingled portion of the track, or the "read" width available to a read head. Bands may end with an unshingled "fat" track 406, such as track N of FIG. 4, which does not have a reduced read track pitch relative to its write track pitch because it is not partially overlapped by a track that can be written to. Because the last track 406 is not overlapped by a writable track, the band can be rewritten without affecting tracks outside the band. The last track 406 of each band may be followed by a "not-to-be-written" track, or "guard track" 410, preventing the last track from being partially overwritten. Guard tracks 410 provide band boundaries to separate writable tracks of different bands and guard the last track 406 of a band from being trimmed by or trimming tracks outside the band.

When track 0 needs to be re-written, tracks 0 to the fat track N 406 can be rewritten, while tracks in other bands are not affected. In some embodiments, a single guard track may be used, while in some embodiments multiple tracks may be designated as "not to be written" between bands to provide a larger buffer against ATI. A guard track may also be referred to as a guard band or isolation track.

Writing to a shingled band may include writing a first track, then writing a next adjacent track, and so on until writing the "fat" track at the end of the band opposite to the first track. If data within the band is to be updated or changed, a read-modify-write (RMW) operation, sometimes call a banded rewrite operation (BRO) may be performed. A BRO may include reading the data from the band into a RAM memory or some other "workspace" memory, modifying the read data with the new data to be written, and then writing the modified data back to the original band or to another band. For example, if new data is to be written to track six of a fifty-track band, the entire band may be read, the data for track six may be modified, and the modified band data may be re-written. A partial BRO may include reading a modifying a portion of a band, while maintaining the shingled write order. For example, if new data is to be written to track twenty of a fifty-track band, a partial BRO may include reading tracks twenty through fifty, modifying the data for track twenty, and rewriting tracks twenty through fifty. The data of tracks one through nineteen may not need to be modified. In a situation where a track has been trimmed or partially overwritten on both sides, the data on the track may become unrecoverable, and a read attempt may result in a shingled unrecoverable data error (UDE). Shingled UDEs are discussed in regard to FIG. 5.

Figure 5:
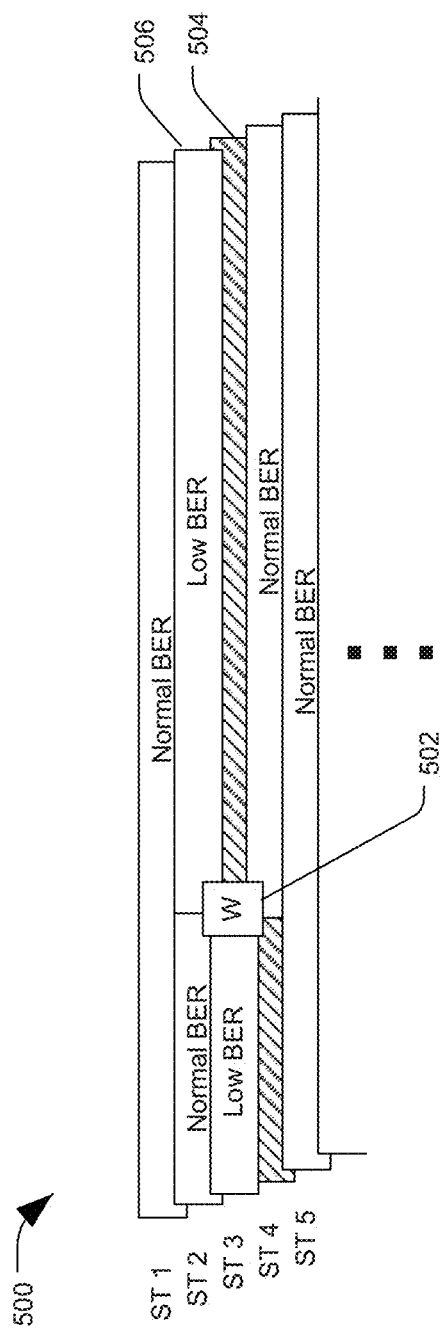
FIG. 5 is a diagram of a system for detecting shingled overwriting errors, in accordance with certain embodiments of the present disclosure.

FIG. 5 is a diagram 500 of a system for detecting shingled overwrite errors, in accordance with certain embodiments of the present disclosure. In particular, diagram 500 depicts a set of five shingled tracks (STs) from a shingled recording band, labeled ST1 through ST5. In the depicted example, the positive recording direction is from ST1 to ST5.

The data storage drive (DSD) may use a write head 502 to perform writes and banded rewrite operations (BROs). In the depicted example, data was written to ST1, followed by ST2, followed by a first portion of ST3. In a normal BRO, writing ST2 would also require rewriting ST3 through ST5 if those tracks contained valid data. However, in the depicted embodiment the BRO may have been interrupted at point 502. Accordingly, the remainder of ST3, as well as the following tracks ST4 and ST5, were not rewritten. Failure to complete a BRO may be caused an unexpected power loss or other event that would interrupt the DSD during write operations. Due to the interrupted BRO, the hashed areas 504 of ST3 and ST4 have been overlapped by both adjacent tracks, and the data from that area 504 may be unrecoverable. Further, after an unexpected power loss or other event, the DSD may not have a record of where the BRO was interrupted, and therefore may not be aware of the problem at area 504.

When the DSD attempts to read data from area 504, the DSD may encounter a UDE. For example, the drive may begin a read operation on ST2 or the validly written portion of ST3, and then encounter a UDE at 502, the first data sector of area 504. In a DSD with no way to determine whether the error is a singled UDE, the DSD may attempt to employ error recovery operations to retrieve the data from that first sector. Error recovery operations may include retrying the read on one or more subsequent disc revolutions, modifying an offset position of the read head relative to the track ST3, adjusting read channel parameters used to decode signals retrieved from the sector into valid digital data, or other error recovery operations. If the DSD fails to recover the data from the first sector, it may then attempt to resume the read operation at the next sector, and again encounter a UDE, and again attempt error recovery operations. This process may continue for each subsequent sector of area 504 that was included in the read operation. As error recovery operations may be time consuming, attempting error recovery at these sectors may result in the original command timing out, or potentially subsequent commands received from a host while the DSD is attempting to recover data for the first command.

A DSD may therefore be configured to determine whether an encountered UDE is due to shingled overwriting, such as by employing a shingled error detection (SED) module of FIGS. 1 and 2. A shingled UDE may be determined by analyzing the read signal quality of sectors preceding the encountered UDE. Because the sectors 506 preceding a UDE have not been overlapped by subsequent tracks, they are wider than normal shingled tracks, and therefore may provide stronger or more reliable read signals. Often the length of a shingle UDE area 504, and correspondingly the length of the unshingled area 506, will each be approximately one track in length, and engage two tracks (e.g. unshingled area 506 engages tracks ST2 through ST3).

One way to determine read signal quality is by measuring a number of bit errors or a bit error ratio (BER). A DSD may detect bit errors when reading data from a sector. The BER can represent the number of bit errors divided by a total number of transferred bits, and may be measured or calculated on a sector by sector basis. The lower the BER, the fewer bad bits are detected, indicating a strong signal. A large number of bit errors or a high BER indicates a weak or unreliable signal. Correctly shingled tracks (i.e. shingled in one direction only), such as ST1 and ST5, should exhibit an approximately consistent average BER (or "normal" BER). Sectors that have not been overlapped, such as area 506, should exhibit fewer errors and a lower BER than the average.

Another method to determine read signal quality is by analyzing variable gain amplifier (VGA) values for a sector. A read channel of a DSD may use a VGA to amplify a read signal from a disc when converting the signal into binary values. A lower VGA value indicates that a strong signal was detected and less amplification is required, while a higher VGA value indicates a weaker signal requiring more amplification. Similar to BER, shingled tracks should exhibit an approximately consistent average VGA value, while unshingled areas 506 may exhibit lower VGA values.

Accordingly, a SED module may analyze a number of bit errors, the BER, a VGA value, or some other read signal metric of one or more sectors preceding the sector at which the error was encountered, and compare the value against a threshold. The threshold may be a read signal metric value that represents a value between a shingled track read signal metric value and an unshingled track read signal metric value. Thus, the threshold value allows the SED module to differentiate between a shingled track and an unshingled track. For example, the threshold value could represent a BER threshold, where a measured BER value higher than the threshold indicates a shingled track, and a BER value lower than the threshold indicates an unshingled track.

The one or more sectors preceding the error may be sectors immediately before the error sector; i.e. the last successfully read sectors. If the read signal of those sectors is lower than a threshold value, the SED module may determine that those sectors have not been shingled, and therefore that the encountered error is likely to be a shingled UDE and not recoverable. The DSD may therefore forego or limit error recovery operations to avoid command time-out situations.

For example, slim or shingled sectors may produce an average of approximately 240 bit errors per sector, while wide unshingled sectors may produce an average of approximately 135 bit errors. A read signal threshold value between the averages may be selected for determining whether a sector is shingled or unshingled. If a threshold of 170 bit errors per sector is selected, sectors having less than that threshold may be determined to be wide or unshingled sectors, while sectors having more may be determined to be shingled sectors.

Additional or different thresholds may also be used. For example, rather than using a single threshold of 170, additional or secondary thresholds of 165 and 175 may be used. If the measured read signal values for the preceding sectors fall within 165 and 175, the SED module may control the DSD to read the sectors preceding the error again (and may also include an attempt to re-read the error sector, in case the re-read is successful). The read signal metrics of the re-read may be combined or averaged with the read signal metrics of the original read to obtain more reliable values and reduce the probability of misclassifying of the error. The combined or averaged values may be compared against the first threshold value of 170 to make the final error determination.

The threshold value may be set by a manufacturer of the DSD, such as based on device testing results. For example, during a certification process for a DSD, bit error rates could be measured for both shingled and unshingled tracks, by writing test data to tracks and then reading it back. A threshold value between the shingled and unshingled track results may be selected and stored to the DSD. Testing could be performed for different discs, or for different data storage zones of a disc, with each zone including a plurality of concentric tracks or shingled bands. Different recording heads may produce different error rates for different discs or zones, and threshold values could be selected and stored for each, for example to a table data structure. During device operation, the SED module may retrieve the stored threshold value for the DSD, or for the disc or zone at which the error was encountered.

The threshold value may also be set or modified by the DSD itself. The DSD may log bit error rates or other metrics as part of device initialization, during normal host command processing, or at other points. The threshold values for the DSD, or for a particular disc or zone, may be set or modified based on the measured results.

To improve the accuracy of the determination as to whether the preceding sector(s) are shingled, the average read signal metrics of multiple sectors may be used. For example, the number of bit errors of the ten sectors preceding the error sector may be added together and divided by ten. The computed average may be compared against the read signal threshold to produce an even more accurate determination regarding the measured sectors.

As discussed in relation to FIG. 4, the last track N of a shingled band of N tracks may be a "fat" unshingled track. Being unshingled, track N may produce fewer bit errors and a stronger signal than a shingled track. If a DSD encounters an error while reading from track N, checking preceding tracks may indicate fewer errors and suggest a shingled UDE. However, a DSD may be configured to know which tracks are the last tracks in a band, and may forego the shingled UDE detection for errors on those tracks, or modify the process. Even if track N−1 is written to partially overlap track N, the data of track N should still be recoverable using different read head offsets, because track N is not also shingled on the side opposite track N−1. Additionally, shingled UDEs would typically exhibit lower error rates for a full track of sectors preceding the error sector, while for a properly written band only the sectors of the last track itself would exhibit lower error rates. Accordingly, if an error is encountered on the last track that is not due to shingled overwriting, checking the sectors one track preceding the error would not exhibit lower error rates. Checking those sectors one track preceding the error may be another method of determining whether an error on the last track is due to shingled overwriting.

In addition to detecting shingled UDEs while executing host read commands, a DSD may also employ shingled UDE detection to locate a point at which a BRO was interrupted, for example as part of recovery operations following an unexpected power event. The DSD may maintain a non-volatile copy of original or modified data from a shingled band during a BRO, and may use the copy to re-write the band after recovering from an unexpected power event. For example, during a BRO the DSD may read data from a target band, modify the read data with new data to create modified data, and then write a portion or all of the modified data to Flash memory or a disc cache location before writing the data back to the target band.

A SED module may determine the bit error count, BER, VGA value, or other read signal metric of preceding sectors in a number of ways. In some examples, after encountering an error the SED module may direct the DSD to re-read one or more sectors preceding the error location. The SED module may note the number of detected bit errors, calculate one or more BER values, and compare the BER value(s) against a threshold value. If the values are lower than the threshold, the sectors have likely not been shingled, and the error may be determined to be a shingled UDE. If the values are above the threshold, the sectors are likely shingled and the error may be determined to be a non-shingled UDE.

In another example, the DSD may maintain a buffer into which bit error or read signal data may be stored during read operations. When an error is encountered, the SED module may retrieve information from the buffer in order to determine whether the error is a shingled UDE, without the need to re-read preceding sectors. An example of the buffer is described in regard to FIG. 6.

FIG. 6 depicts a table representing data stored to a buffer 600 of a system for detecting shingled overwrite errors, in accordance with certain embodiments of the present disclosure. Buffer 600 may include a data structure such as a table, list, or queue. Buffer 600 may also refer to an area of memory allocated to store the data described herein. Buffer 600 may be used to store information regarding bit errors or signal strength for a set of data sectors. A SED module may set up the buffer 600 in a memory such as DRAM for use during read operations, for example by allocating an amount of space in the memory. The buffer 600 may be configured to store data for a number of entries, depicted in FIG. 6 as entries 1 through N. Each entry may store data regarding a single data sector, or regarding a plurality of data sectors. The number of entries may be predetermined and static, variable, or otherwise configured. For example, the buffer 600 may always contain ten entries, or it may be set up to contain a number of entries corresponding to a number of sectors to be read, up to a maximum of the number of sectors on a full data track.

If a read operation involves reading more sectors than there are entries in the buffer 600, the buffer may be employed in a wrap-around style. The DSD may maintain a pointer 602 to a current or next entry in the buffer 600, and when the last entry in the buffer 600 is reached the pointer may be wrapped around back to the first entry. In this manner the oldest entries will be replaced with the newest entries. In FIG. 6, it can be seen that entry N includes information on sector ID 00107, while entry 1 continues with sector ID 00108 and so on, indicating that the buffer point 602 has wrapped around at least once.

As described, each entry of buffer 600 may include information regarding one or more sectors. In the depicted embodiment, each entry includes information for one sector. Each entry may include multiple types of information regarding the sector, such as a sector ID 604, a number of bad bits or bit errors detected at the sector 606, a VGA value 608, and so on. Additional information may also be stored to the buffer 600, such as BER values, VGA values, or other information.

During read operations, data may be stored to the buffer 600 by the SED module, a servo control circuit, by components of a read channel, or other elements of the DSD.

When a DSD encounters an error during a read operation, the SED module may access the buffer 600 to determine a read signal quality for the sectors preceding the error sector. The SED module may calculate or retrieve bit error totals 606, BERs, VGA values 608, or other metrics for the sectors. Additionally, the SED may calculate averages or totals for a plurality or all of the preceding sectors, or perform other operations to determine a read signal quality for the sectors preceding the error signal. The SED may compare the retrieved or computed values against a threshold value to determine whether to categorize the error as a shingled UDE or a UDE not caused by shingling.

There may be instances where an error is encountered before enough sectors have been read to populate the buffer 600 with data. The SDE module may make a determination based on the sectors that have been read (e.g., if the sector includes ten entries but only four have been populated). The SDE may calculate averages based on the number of sectors read rather than the total number of entries in the buffer 600. Depending on the number of sectors read before the error was encountered, this may reduce the confidence of the determination, but should still be sufficiently accurate to base a determination of the nature of the error on. When the buffer 600 has not been filled the SDE may also control the DSD to perform a read operation on a number of sectors preceding the error. The additional read could be used to fill some or all of the buffer 600, thereby improving the reliability of the UDE determination.

Figure 7:
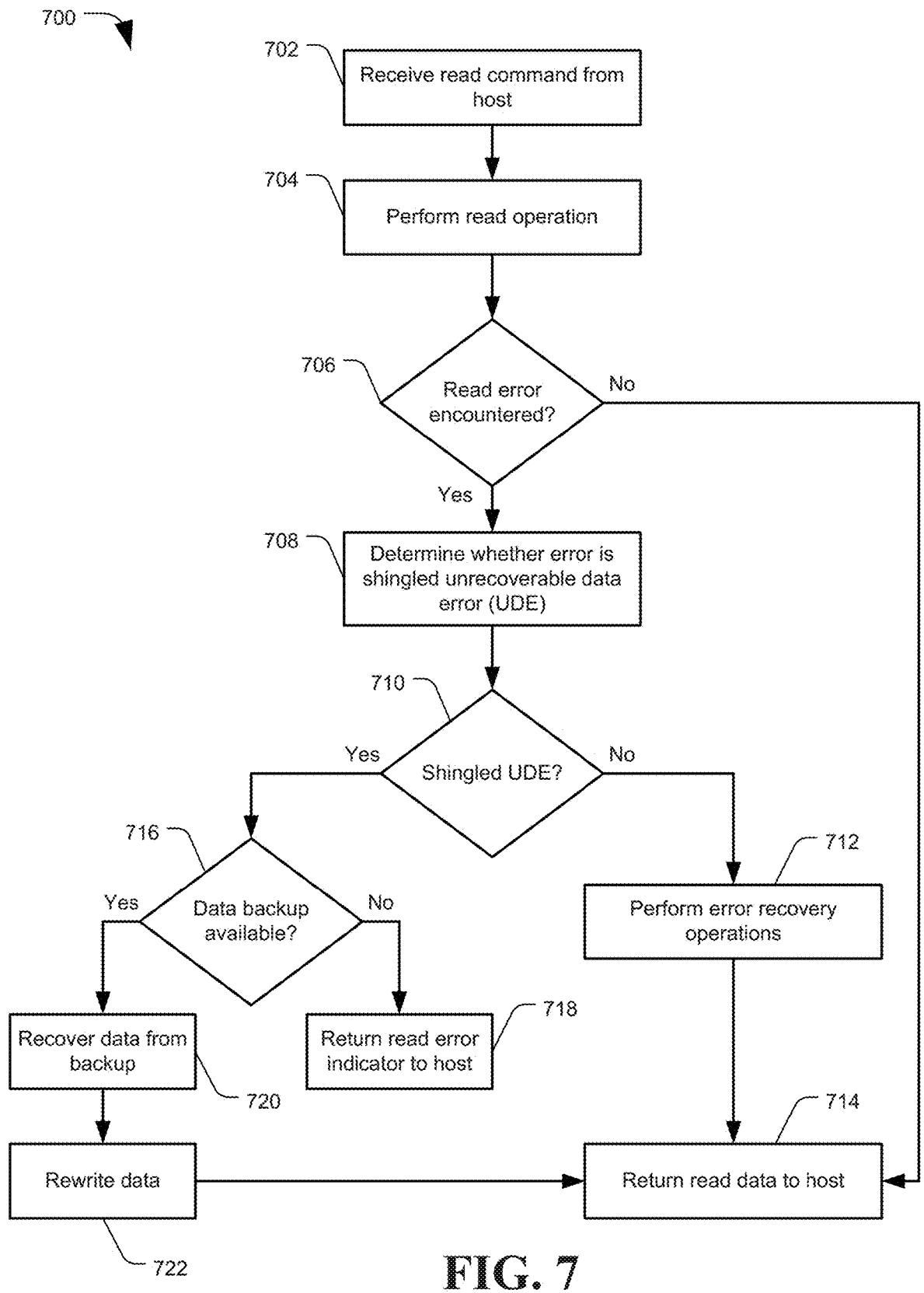
FIG. 7 is a flowchart of a method of detecting shingled overwrite errors, in accordance with certain embodiments of the present disclosure.
Figure 8:
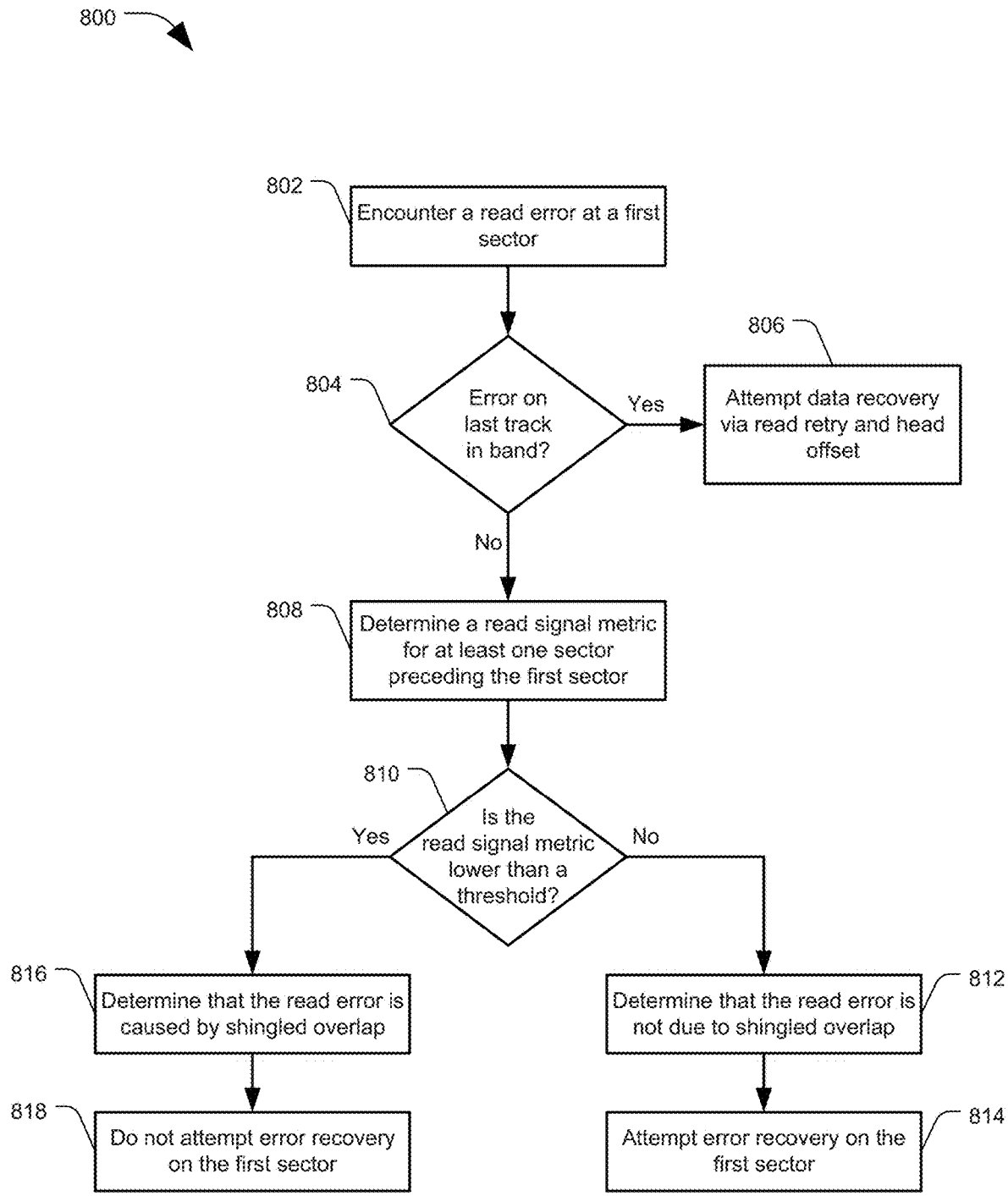
FIG. 8 is a flowchart of a method of detecting shingled overwrite errors, in accordance with certain embodiments of the present disclosure.
Figure 9:
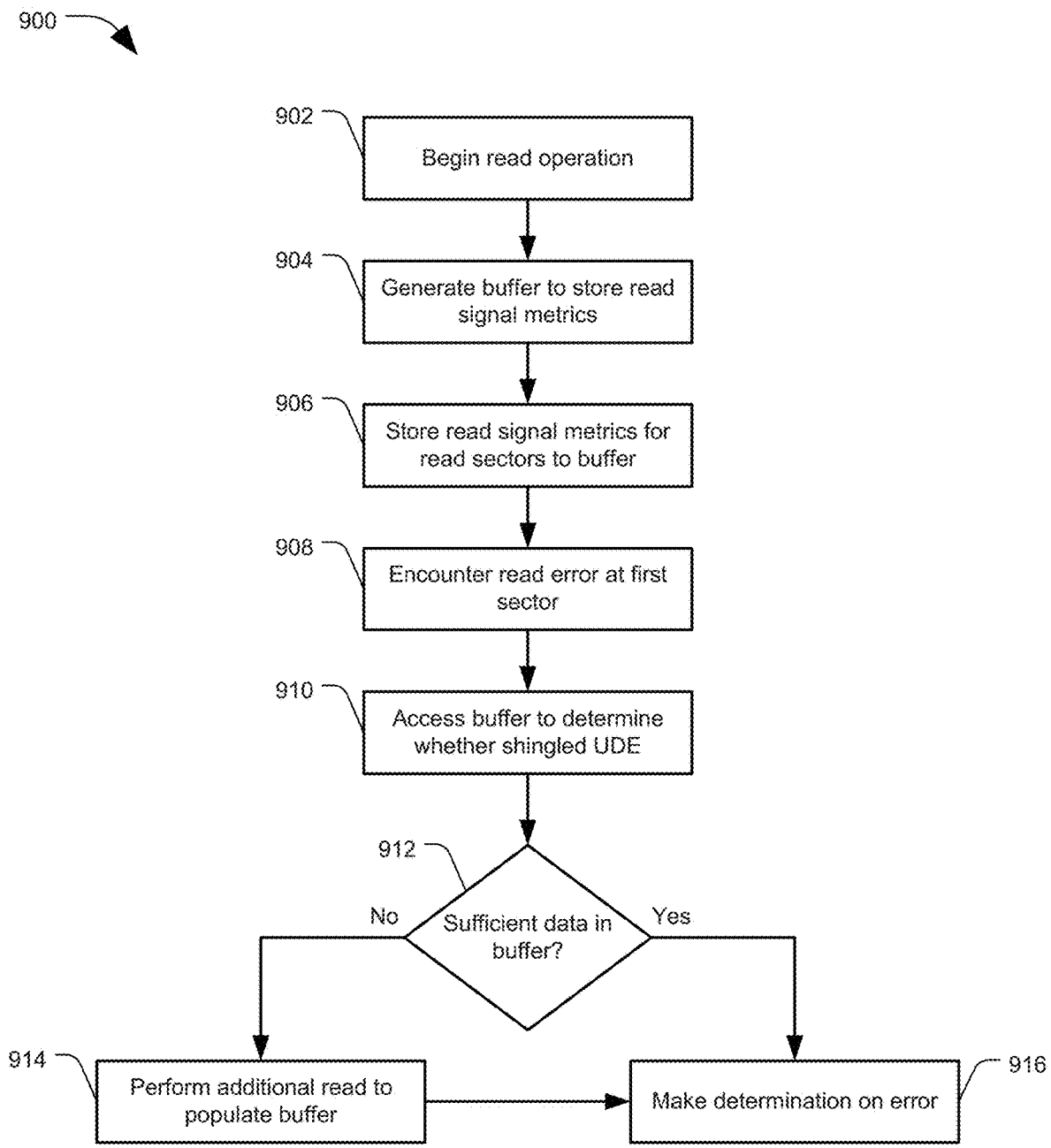
FIG. 9 is a flowchart of a method of detecting shingled overwrite errors, in accordance with certain embodiments of the present disclosure.

Example methods of detecting shingled overwriting errors are discussed in regards to FIGS. 7, 8, and 9. The methods may be performed by a data storage device as shown in FIGS. 1 or FIG. 2, for example using a shingled error detection (SED) module, a data storage control circuit, other components, or any combination thereof.

FIG. 7 is a flowchart of an example method 700 of detecting shingled overwrite errors, in accordance with certain embodiments of the present disclosure. Method 700 may include receiving a read command from a host device at a DSD, at 702. Alternately, the read operation may be initiated by the DSD itself, for example as part of recovery procedures following an unexpected power event.

The DSD may perform the read operation, at 704. While the read operation is progressing, a determination may be made as to whether any read errors, sometimes called unrecoverable data errors (UDEs), have been encountered, at 706. Read errors may occur when the magnetic signals received from a sector cannot be accurately converted into reliable binary bits, or when the data includes too many bad bits to be corrected by the drive. Read errors may be caused by a variety of factors, such as a write head writing the data off-center, interference from nearby writes, an unreliable media surface, or data being overwritten due to shingling from nearby tracks on both sides of the target track.

If no error is encountered, at 706, the method 700 may include returning the read data to the host, at 714. If a read error is encountered, the method 700 may include determining whether the error is a shingled UDE caused by shingled overwriting of the track, at 708. The determination may be made based on the read signal quality of sectors preceding the erroneous sector (i.e. preceding based on the order of writing while following shingled writing conventions). Explanations of determining whether the error is a shingled overwriting error are discussed above and in relation to FIGS. 8 and 9.

If the error is determined not to be a shingled UDE, at 710, the method 700 may include performing error recovery operations on the erroneous sector, at 712. For example, the DSD may attempt read retries on the sector, adjusting read head and read channel parameters, performing other error recovery operations, or any combination thereof. The read data may then be returned to the host, at 714.

If the error is determined to be a shingled UDE, at 710, the method 700 may optionally include determining whether a data backup is available for the erroneous sector, at 716. For example, the DSD may be configured to maintain a nonvolatile copy of data being written or modified by a banded rewrite operation (BRO) in case the write is interrupted, in order to avoid data loss due to shingled overwrite errors. The DSD may check a nonvolatile backup location, write logs, or other information sources to determine the availability of a data backup. If no data backup is available, the method 700 may include returning an error or read failure notification to the host, at 718. Generating a failure indication without attempting further error recovery may prevent commands from timing out and improve performance for the DSD and host.

If a data backup is available, at 716, the method 700 may include recovering the data from the backup location. The method 700 may optionally include rewriting the recovered data to restore the sectors of the band made unreadable due to shingled overwriting, at 722. The recovered data and any other requested data may also be returned to the host, at 714.

Due to the nature of shingled overwrite errors, encountering one shingled overwrite error suggests that approximately a full track's worth of sectors will also be unreadable due to shingled overwriting. If a read command would include reading sectors sequentially following the first shingled UDE, the DSD may not attempt to read the following sectors, or may skip ahead a half a track or a full track to resume reading attempts, rather than attempting to determine the nature of errors at each sequential sector. In other embodiments, the DSD may perform the error determining methods for each sector at which an error is encountered.

Turning now to FIG. 8, a flowchart of an example method 800 of detecting shingled overwrite errors is shown and described, in accordance with certain embodiments of the present disclosure. The method 800 may include encountering a read error at a first sector while executing a read operation, at 802. In response to encountering the read error, at 804 the method 800 may include determining whether the error was encountered on the last track of the target band; i.e. the first sector is on a "fat" unshingled track. Final tracks in a band may be tracked via a table, by counting track multiples (e.g. each band may include 100 tracks, so every $100^{th}$ track may be an unshingled track), or by other methods. If the error was encountered on the last track, the method 800 may include attempting data recovery by performing a read retry on the sector, at 806. The read retry may include offsetting the read head, in case the track was partially overlapped by the preceding track.

If the error was not encountered on the last track of a band, at 804, the method 800 may include determining a read signal metric or value for at least one sector preceding the first sector, at 808. As discussed, the read signal metric may be a count of bit errors detected at those sectors, a bit error ratio (BER), a VGA value, or some other metric. An SED module may determine the read signal metrics by retrieving information from a buffer to which read signal data was stored during the read operation, or may involve performing a read operation on the at least one preceding sector in order to gather the read signal values.

At 810, the method 800 may include determining whether the read signal metric is lower than a threshold value retrieved from memory. For example, if the read signal metric is a count of errors or a BER value, a low value (i.e. below a threshold) may indicate that the sectors preceding the error are not shingled, which suggests that the read error is caused by shingled overwriting of the data. Depending on a type of read signal metric employed, a value below a threshold may indicate shingled tracks or unshingled tracks, and the method can be adjusted accordingly. For example, if the metric is read signal quality, a high value (i.e. above a threshold) would indicate unshingled tracks and suggest a shingled UDE.

Returning to method 800, if the read signal metric is not lower than the threshold, at 810, a determination may be made that the read error is not due to shingled overlap of the first sector, at 812. The method 800 may include attempting error recovery operations on the first sector to attempt to recover the stored data, at 814.

If the read signal metric is lower than the threshold, at 810, the method 800 may include determining that the read error is caused by shingled overlap of the first sector, at 816. The method 800 may include not attempting error recovery operations on the first sector, and may instead include reporting a read failure for the read operation, at 818.

FIG. 9 is a flowchart of an example method 900 of detecting shingled overwrite errors, in accordance with certain embodiments of the present disclosure. In particular, method 900 is directed to a method of populating and accessing a read signal quality buffer.

Method 900 may include beginning a read operation, at 902. The read operation may be performed in response to a host read command, or internally initiated by the DSD. The DSD may generate a buffer to store read signal metrics, at 904, in response to beginning the read operation. For example, a shingled error detection (SED) module may allocate a space in DRAM or another memory to store read signal metrics for sectors included in the read operation. The buffer may have a variable size based on a number of sectors involved in the read operation, or it may be a consistent fixed size, such as large enough to store read metrics for ten sectors. In some embodiments, a buffer may remain allocated in memory during drive operation, for example as part of a boot up process, and may not be allocated in response to initiating a read.

At 906, the method 900 may include storing read signal metrics for read sectors to the buffer. Data stored to the buffer may include sector IDs, a count of bit errors detected, VGA values for the sector, other information, or any combination thereof. The data may be obtained and stored to the buffer by components of the DSD including read heads, a read and write channel, servo control subsystems, the SED module, other components, or any combination thereof.

The method 900 may include encountering a read error at a first sector during the read operation, at 908. In response to encountering the read error, the method 900 may include accessing the buffer to obtain read signal metrics for sectors preceding the first sector, in order to determine whether the read error is a shingled unrecoverable data error (UDE) caused by adjacent shingled tracks overwriting the data of the first sector. A determination may be made as to whether sufficient data has been stored to the buffer to determine whether the error is a shingled UDE, at 912. A sufficient amount of data may be a read signal metrics for some set minimum number of sectors preceding the first sector. For example, a DSD may be configured to only make the determination regarding the UDE when the entire buffer is filled; e.g., with read signal metrics for ten preceding sectors for a ten sector buffer. The DSD may calculate an average for all the preceding sectors in the buffer for use in determining the nature of the error. In other embodiments, metrics from a single preceding sector may be sufficient.

If a sufficient amount of data is not in the buffer (e.g. if the error at the first sector was encountered shortly into the read operation), the method 900 may include performing an additional read operation on preceding sectors in order to sufficiently populate the buffer, at 914. For example the SED module may initiate a read for the minimum number of necessary preceding sectors to obtain the read signal metrics for the buffer. Once the additional read has been performed, or if there was sufficient data in the buffer at 912, the method 900 may include making a determination on the nature of the error, at 916. For example, making the determination on the nature of the error may involve performing the method of FIG. 7, performing the method of FIG. 8, or a combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a processor configured to:
   detect an error at a first sector when performing a read operation on a recording track;
   determine a read signal metric based on a read signal quality of one or more sectors preceding the first sector, the read signal metric indicating whether the error is caused by overwriting from an adjacent track;
   performing error recovery operations on the first sector when the read signal metric is not lower than a threshold value; and
   not performing error recovery operations on the first sector when the read signal metric is lower than the threshold value.

2. The apparatus of claim 1 comprising the processor further configured to determine whether the error is caused by overwriting from an adjacent track based on comparing the read signal quality to the threshold value.

3. The apparatus of claim 2 comprising the processor further configured to:
   determine the read signal quality based on a number of bit errors detected in the one or more sectors preceding the first sector; and
   determine that the error is caused by overwriting from an adjacent track when the read signal quality is less than the threshold value.

4. The apparatus of claim 3 comprising the processor further configured to:
   calculate a bit error ratio (BER) based on the number of bit errors and a total number of bits read from the one or more sectors to determine the read signal quality; and
   determine that the error is caused by overwriting from an adjacent track when the BER is less than the threshold value.

5. The apparatus of claim 2 comprising the processor further configured to:
   determine the read signal quality based on a variable gain amplifier (VGA) value for the one or more sectors preceding the first sector; and
   determine that the error is caused by overwriting from an adjacent track when the read signal quality is less than the threshold value.

6. The apparatus of claim 2 further comprising:
   the one or more sectors include a plurality of sectors;
   the processor further configured to:
   determine an average read signal quality value by averaging read signal metrics for the plurality of sectors; and
   determine whether the error is caused by overwriting from an adjacent track based on comparing the average read signal quality value to the threshold value.

7. The apparatus of claim 6 further comprising:
   a memory;
   the processor further configured to:
   allocate a buffer in the memory to store read signal metrics for the plurality of sectors; and
   when the error is encountered, access the buffer to determine the average read signal quality value.

8. The apparatus of claim 7 comprising the processor further configured to:
   determine whether the buffer includes read signal metrics for a minimum number of sectors preceding the first sector; and
   when the buffer does not include read signal metrics for the minimum number of sectors, perform an additional read operation on additional sectors preceding the first sector to reach the minimum number of sectors.

9. The apparatus of claim 1 comprising the processor further configured to:
when the read signal metric is lower than the threshold value, determine whether a data backup is available for data of the first sector; and
when the data backup is available, rewrite the first sector using the data backup.

10. The apparatus of claim 1 comprising the processor further configured to:
receive a read command from a host device directing the processor to perform the read operation; and
return a read error indicator to the host device when the read signal metric is lower than the threshold value.

11. A method comprising:
detecting a read error at a first sector when performing a read operation on shingled recording tracks of a data storage device;
determining whether the read error is caused by shingled overwriting of the first sector based on a read signal metric of at least one sector preceding the first sector; and
determining whether a data backup is available for data of the first sector when the error is determined to be caused by shingled overwriting; and
rewriting the first sector using the data backup when the data backup is available.

12. The method of claim 11 further comprising:
determining the read error is not caused by shingled overwriting when the read signal metric is not lower than a threshold value; and
performing error recovery operations on the first sector when the read error is not caused by shingled overwriting.

13. The method of claim 12 further comprising:
determining the read error is caused by shingled overwriting when the read signal metric is lower than the threshold value; and
not performing error recovery operations on the first sector when the read error is caused by shingled overwriting.

14. The method of claim 13 further comprising:
the at least one sector includes a plurality of sectors;
allocating a buffer in a memory to store read signal metrics for the plurality of sectors;
accessing the buffer to obtain the read signal metrics when the read error is encountered;
determining an average read signal quality value by averaging the read signal metrics; and
determining whether the read error is caused by shingled overwriting based on comparing the average read signal quality value to the threshold value.

15. The method of claim 14 further comprising:
determining whether the buffer includes read signal metrics for a minimum number of sectors preceding the first sector; and
when the buffer does not include read signal metrics for the minimum number of sectors, performing an additional read operation on additional sectors preceding the first sector to reach the minimum number of sectors.

16. The method of claim 11 further comprising:
receiving a read command from a host device at a data storage device to perform the read operation; and
returning a read error indicator from the data storage device to the host device when the error is determined to be caused by shingled overwriting.

17. A non-transitory memory device storing instructions that, when executed, cause a processor to perform a method comprising:
detecting a read error at a first sector when performing a read operation on tracks of a data storage device;
determining whether the read error is an error caused by overwriting of the first sector by:
determining a read signal quality of one or more sectors preceding the first sector;
determining whether the read error is caused by overwriting based on comparing the read signal quality to a threshold value; and
canceling an operation for the first sector when the error is determined to be caused by overwriting.

18. The non-transitory memory device of claim 17 storing instructions that, when executed, cause the processor to perform a method further comprising:
the one or more sectors include a plurality of sectors;
allocating a buffer in a memory to store read signal metrics for the plurality of sectors;
accessing the buffer to obtain the read signal metrics when the read error is encountered;
determining an average read signal quality value by averaging the read signal metrics; and
determining whether the read error is caused by overwriting based on comparing the average read signal quality value to the threshold value.

19. The non-transitory memory device of claim 17 storing instructions that, when executed, cause the processor to perform a method further comprising:
receiving a read command from a host device at a data storage device to perform the read operation;
performing error recovery operations on the first sector when the error is determined to not be caused by overwriting; and
returning a read error indicator from the data storage device to the host device when the error is determined to be caused by overwriting.

* * * * *